March 15, 1960    H. P. DIGGLE ET AL    2,928,452
COMPONENT STRAIGHTENING MACHINE
Filed Jan. 17, 1957    9 Sheets-Sheet 1

Inventors
Hammond P. Diggle
Herbert F. Ross
Bruce N. Smith
Augustus D. Willhauck
By their Attorney

*Inventors*
Hammond P Diggle
Herbert F Ross
Bruce N Smith
Augustus D Willhauck
By their Attorney March 15, 1960 H. P. DIGGLE ET AL 2,928,452
COMPONENT STRAIGHTENING MACHINE
Filed Jan. 17, 1957 9 Sheets-Sheet 3
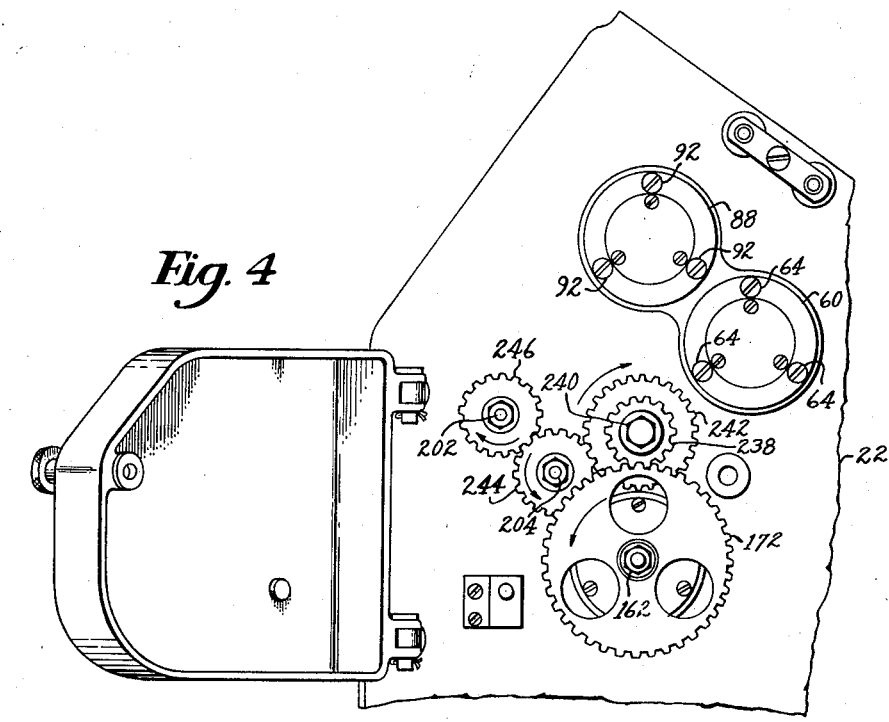
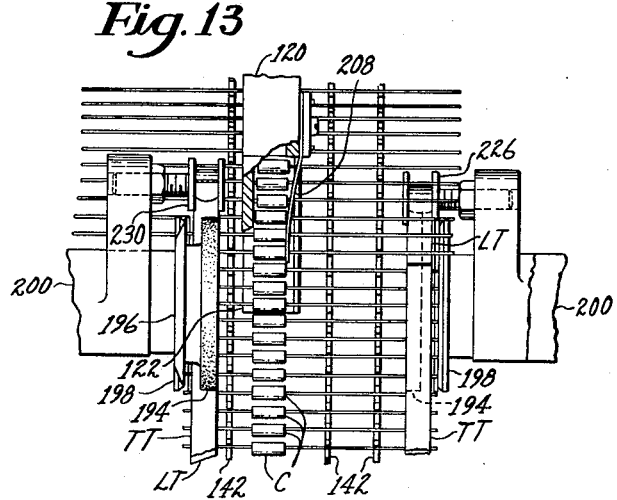
*Inventors*
Hammond P. Diggle
Herbert F. Ross
Bruce N. Smith
Augustus D. Willhauck
By their Attorney

*Inventors*
Hammond P. Diggle
Herbert F. Ross
Bruce N. Smith
Augustus D. Willhauck
By their Attorney

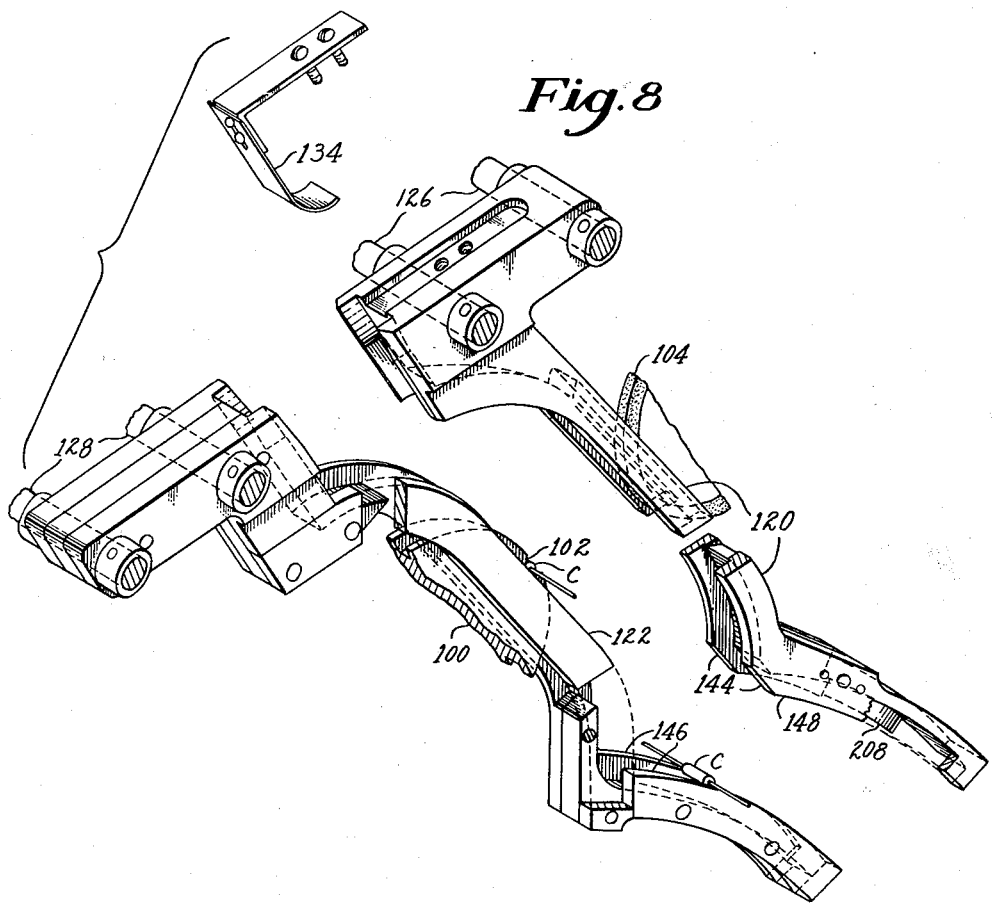

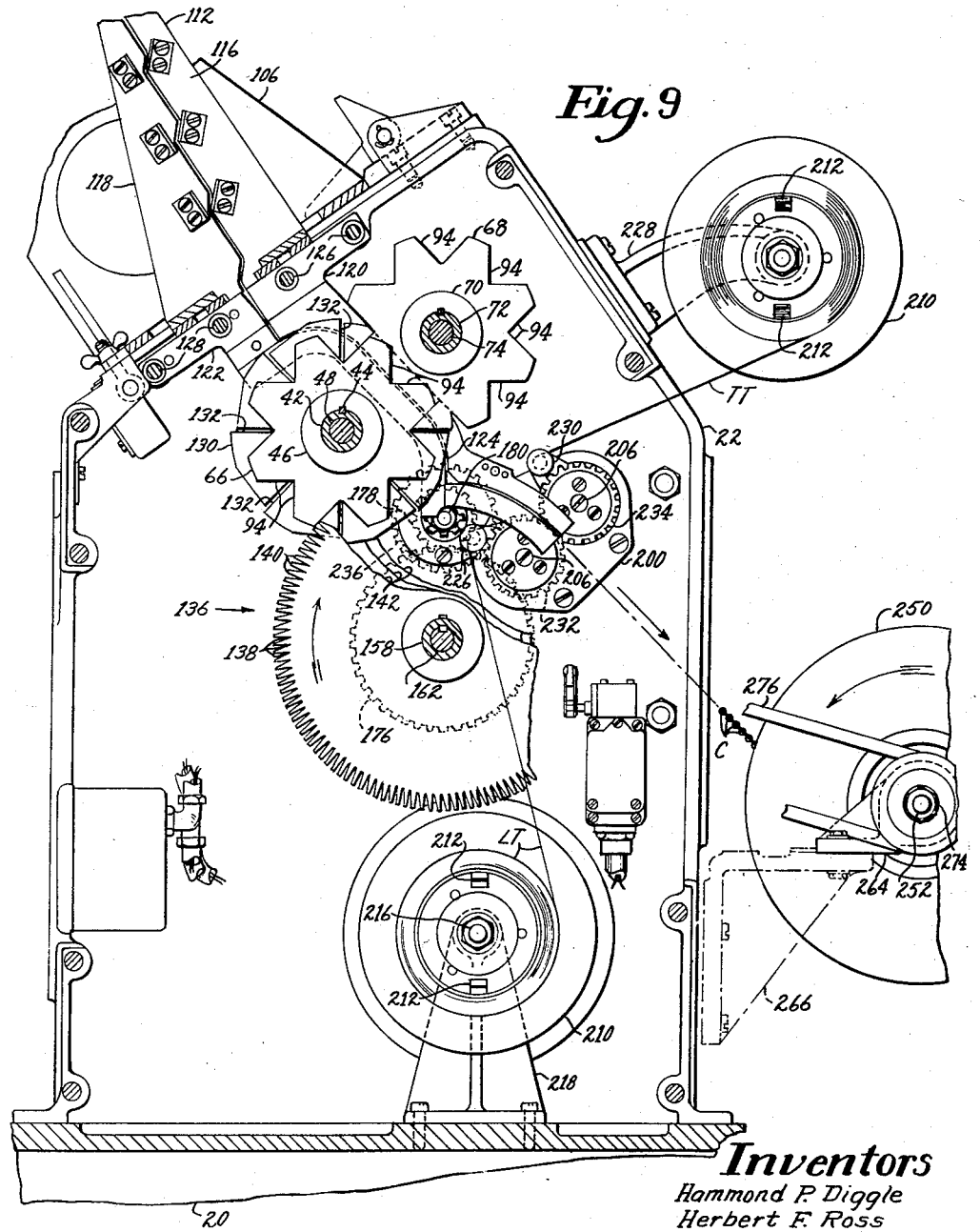

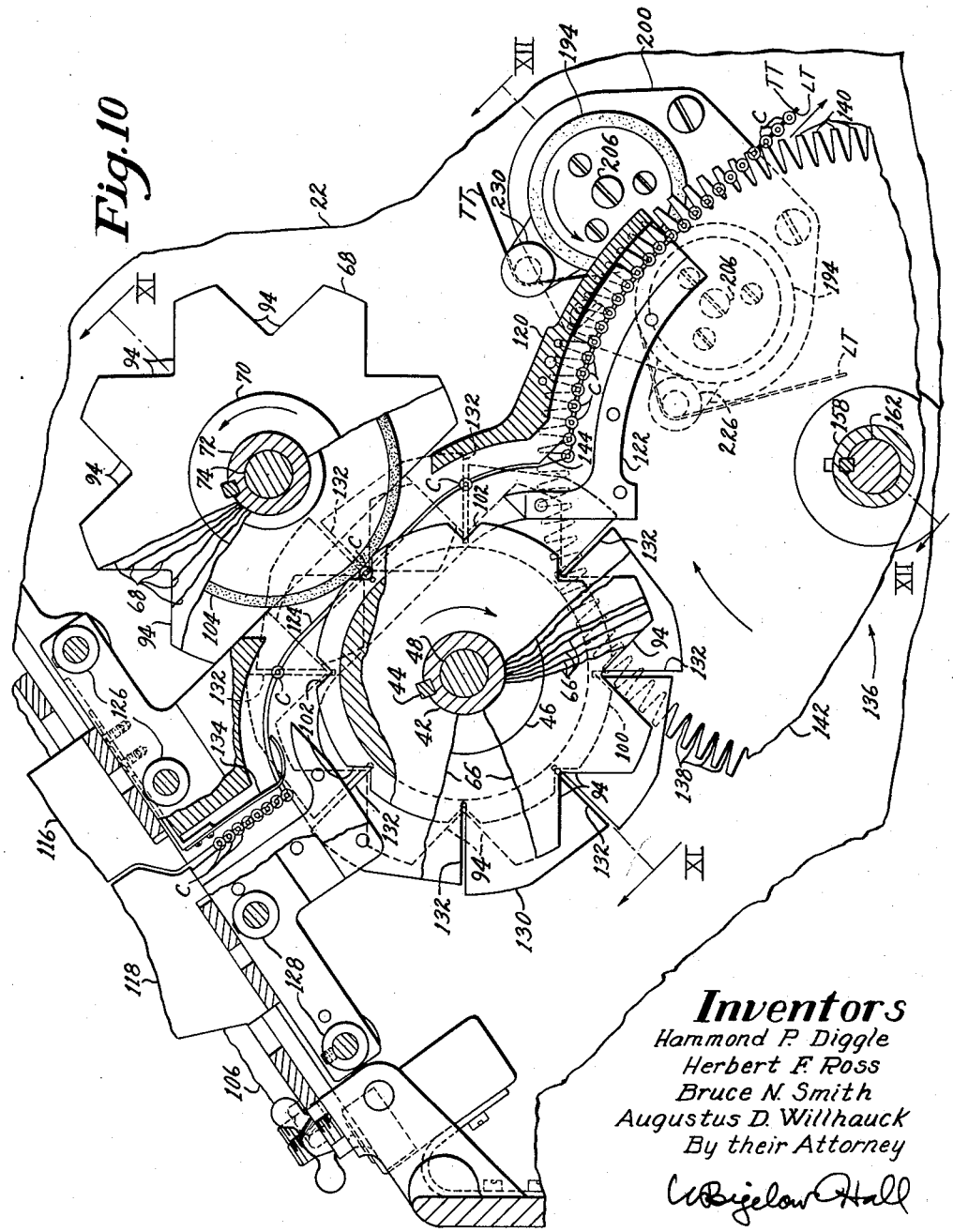

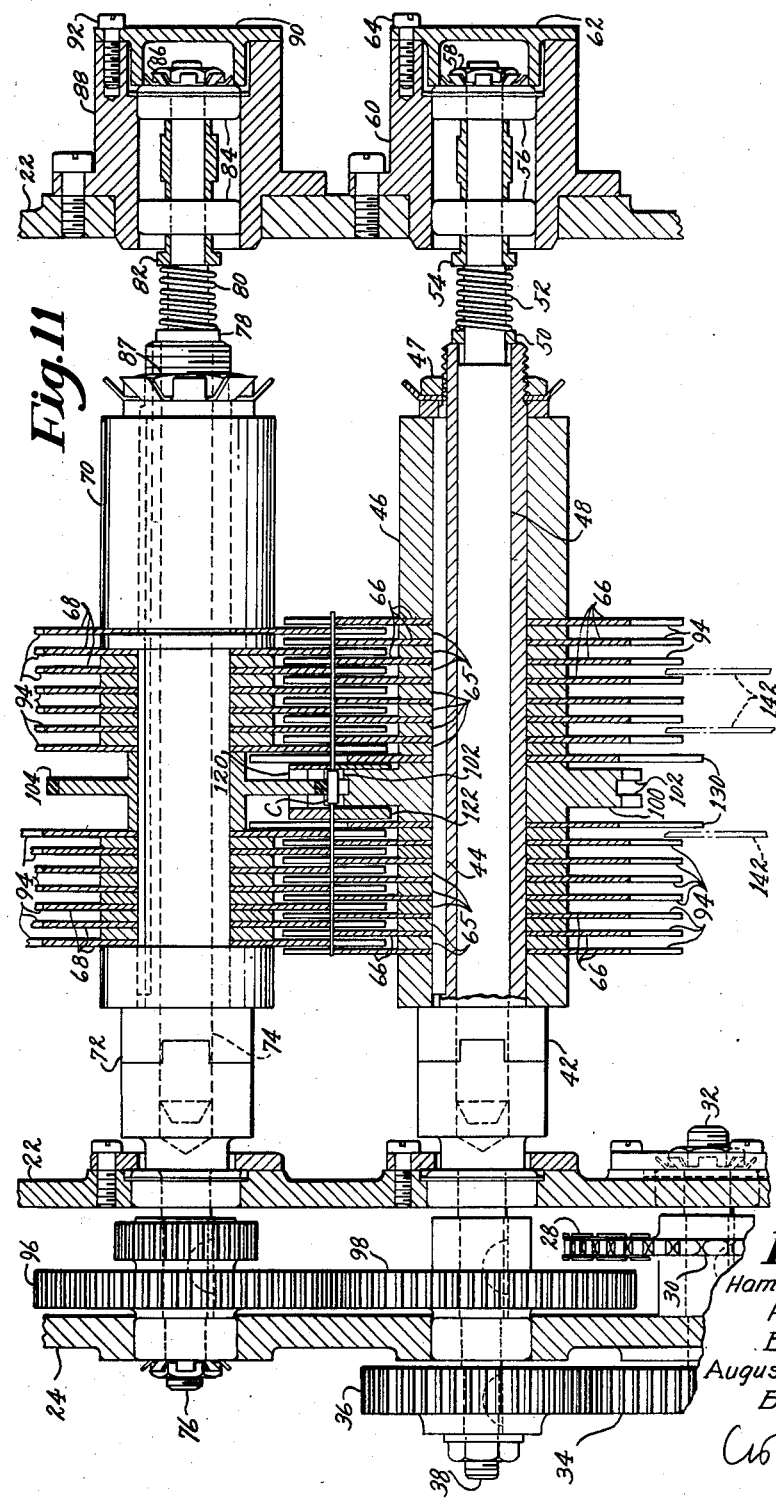

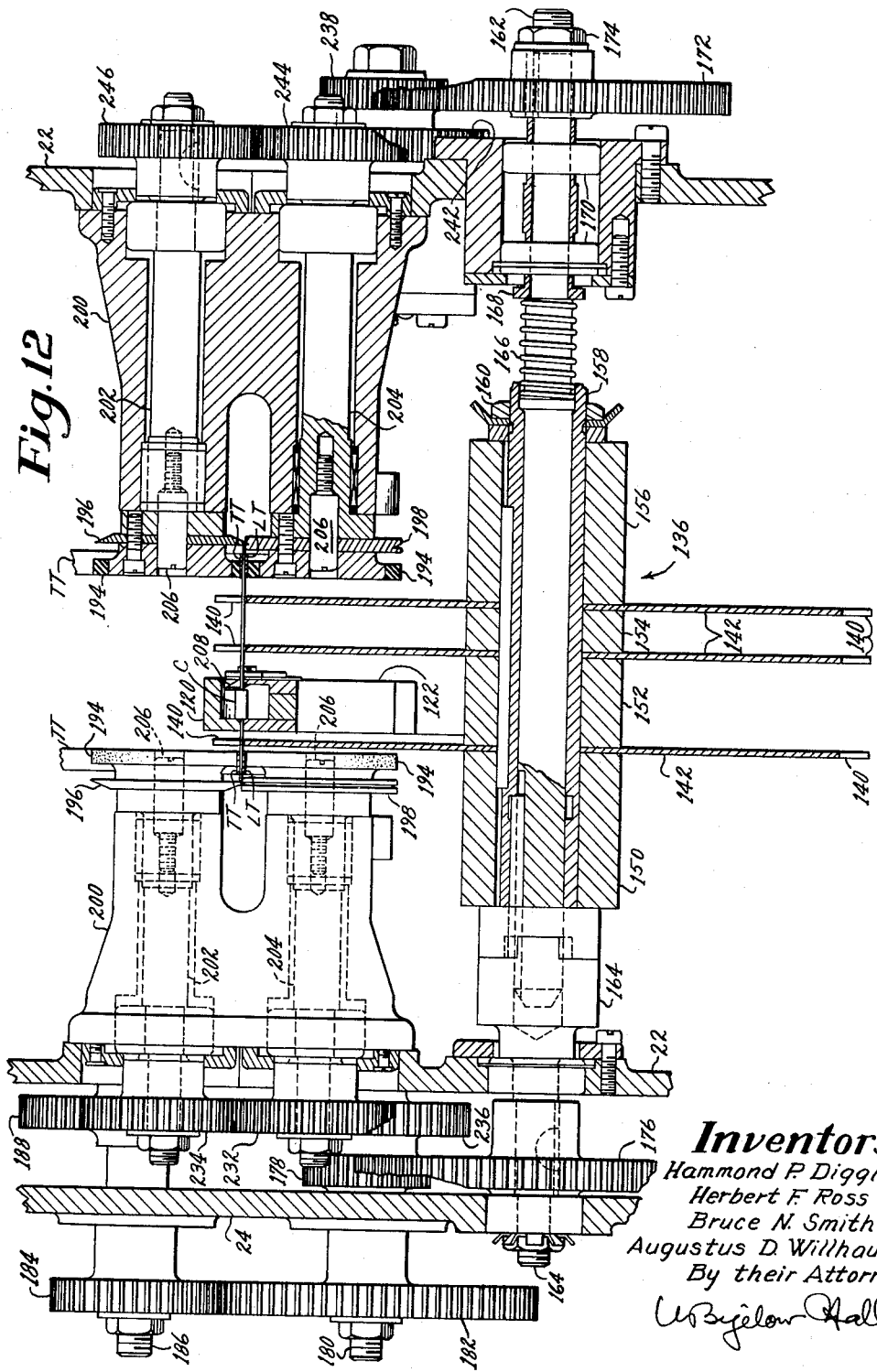

United States Patent Office 2,928,452
Patented Mar. 15, 1960

2,928,452

COMPONENT STRAIGHTENING MACHINE

Hammond P. Diggle, Hamilton, Herbert F. Ross, Winchester, Bruce N. Smith, Oxford, and Augustus D. Willhauck, Stoneham, Mass., assignors to United Shoe Machinery Corporation, Flemington, N.J., and Boston, Mass., a corporation of New Jersey Application January 17, 1957, Serial No. 634,785

5 Claims. (Cl. 153—32)

This invention relates to machines for straightening the leads of components and then connecting them in row formation to facilitate their storage and/or orderly feeding into a component processing machine. While the invention is accordingly herein illustrated as applied to a machine for straightening and belting the leads of successive electronic components, such as resistors, condensers, or the like having axial leads, it will be appreciated that in certain aspects application of the invention is not thus limited but may have utility in the orderly processing of other elongated articles, especially those characterized by slender, wire-like projections. The term "lead," as used herein, is intended to include in its meaning a wire, tab or other bendable termination and accordingly will be understood in its comprehensive sense.

Various machines have been made available for automatically assembling electronic components in chassis. Large quantities of components of different sizes and electrical characteristics are now being installed by these machines in many types of circuits and widely differing forms of chassis. When printed circuit boards are used as chassis the machines customarily form successive axial leads in stable fashion and then insert them endwise into preformed holes in the boards, as disclosed for example in a copending application Serial No. 458,312, filed September 27, 1954, in the names of Leon D. Alderman, Charles P. Cardani, Edwin S. Kant, and Henry B. Kimball. If other types of chassis be used, it may be unnecessary for an installing machine to preform the leads to effect their electrical connection to the circuitry. Almost invariably a higher production of more consistently reliable connections can be effected mechanically if the leads of the successive components have previously been straightened and belted. This is because of the high degree of flexibility normally found in leads and their tendency in the course of normal handling easily to become bent and intertwined, thus rendering it difficult to attain uniform control and positioning of them. To facilitate the supplying of components in the large quantities and orderly manner required by a machine assembly system, it has become common practice to belt the components of each type in row formation by means of tape, the components then being conveniently packaged and available to an appropriate machine, for instance, in the form of reels. United States Letters Patent No. 2,771,206, granted November 20, 1956, in the names of Richard W. Daniels, Hammond P. Diggle, and Bruce N. Smith, discloses one form of machine in which axial lead-type components have their leads straightened and are then belted by tape and accumulated on a supply reel.

A primary object of this invention is to provide an improved machine for bundling axial lead components and the like, said machine to have a high output and incorporate lead straightening and taping means so organized as to afford continuous control of the leads and permit rapid change-over to adapt the machine for operation on different sizes and shapes of components. To this end, and in accordance with a feature of the invention, the illustrative machine comprises two pairs of cooperative lead straightening members respectively arranged to engage the oppositely extending leads of successive components, each of said pairs having the lead engaging portions of their members rotatably movable toward and from a lead straightening position, and means for conducting successive components into and out of said position, said means comprising a raceway, a pair of radially slotted feed discs disposed to pick up successive endmost components from the delivery end of the raceway and advance them by engagement with their leads adjacent to their bodies, respectively, and guide means defining a channel extending from the raceway, adjacent to said disks, and through said lead straightening position. As herein shown, the lead straightening members of each pair are in the form of rotary disks or combs, spaced in axially staggered relation on parallel operating shafts and formed with peripheral coacting V-shaped notches. Preferably, the feed disks are also mounted on one of these shafts and have their radial lead-receiving slots so disposed that their inner ends are respectively in phase and registry with the bottoms of said V-shaped notches, thus affording positive movement of the components and accurate timing of operations thereon.

In accordance with another feature of the invention, there is provided, in a machine of the type indicated, means for applying tape transversely of the straightened leads to belt them consecutively, and a transfer wheel having evenly spaced peripheral teeth, said wheel being rotatably mounted and disposed to receive the successively straightened components between consecutive teeth when discharged from said lead guiding channel and carry the leads into position to be taped by said means, the pitch of said teeth and the speed of rotation of said wheel being so related to the operating rates of said feed disks and said tape applying mechanism as to insure closely uniform spacing of the taped components.

The above and other features of the inventions, including novel details and combinations of parts, will now be more particularly described in connection with an illustrative machine in which the invention is embodied and with reference to the accompanying drawings thereof, in which:

Fig. 4 is a view in side elevation, looking into an upper portion of the machine frame shown in Figs. 1 and 2, and from the opposite side thereof;

Fig. 8 is an exploded perspective view, with portions broken away, of means providing a channel for the successive component bodies upon exit from the raceway;

Fig. 9 is a view corresponding to Fig. 1 but having portions of the machine frame and gear cover removed to reveal lead straightening and taping mechanism;

Fig. 10 is an enlarged view of component feeding and straightening elements shown in Fig. 9, the components being in positions they progressively occupy during operation of the machine;

Fig. 11 is a section taken on the line XI—XI of Fig. 10 and indicating a component in its lead straightening position;

Fig. 12 is a section taken on the line XII—XII of Fig. 10 and indicating a component being belted and trimmed; and Fig. 13 is a plan view of the tape applying mechanism and the component feed wheel teeth shown in Fig. 10.

Figure 1:
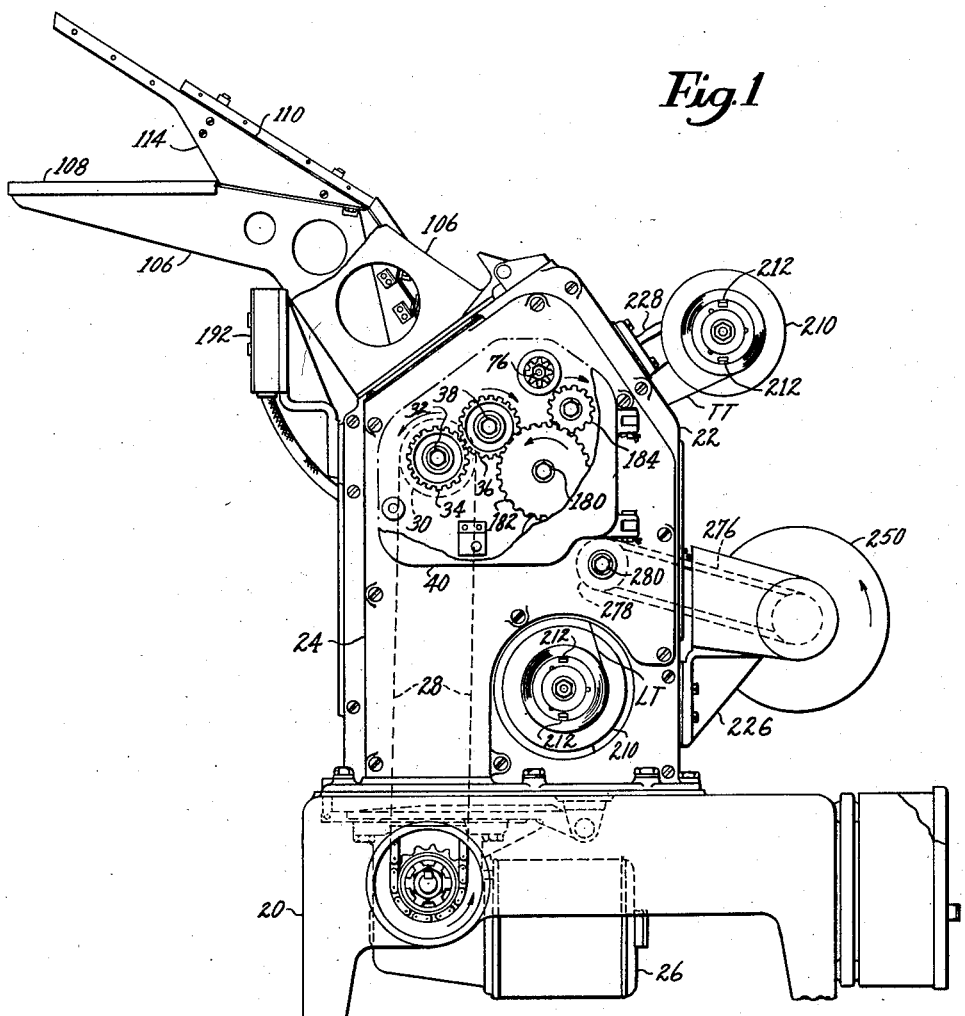
Fig. 1 is a view in side elevation of a machine exemplifying the invention, a portion of a door on a gear cover being broken away to disclose portions of the drive mechanism, including change gears.
Figure 2:
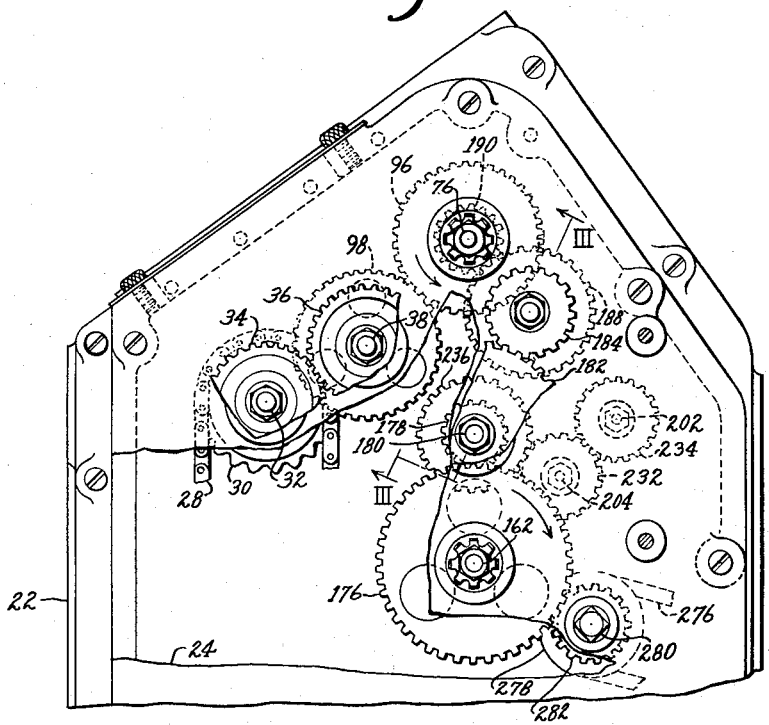
Fig. 2 is a view in side elevation of the upper portion of the frame shown in Fig. 1 and indicating the arrangement of different drive gears.
Figure 5:
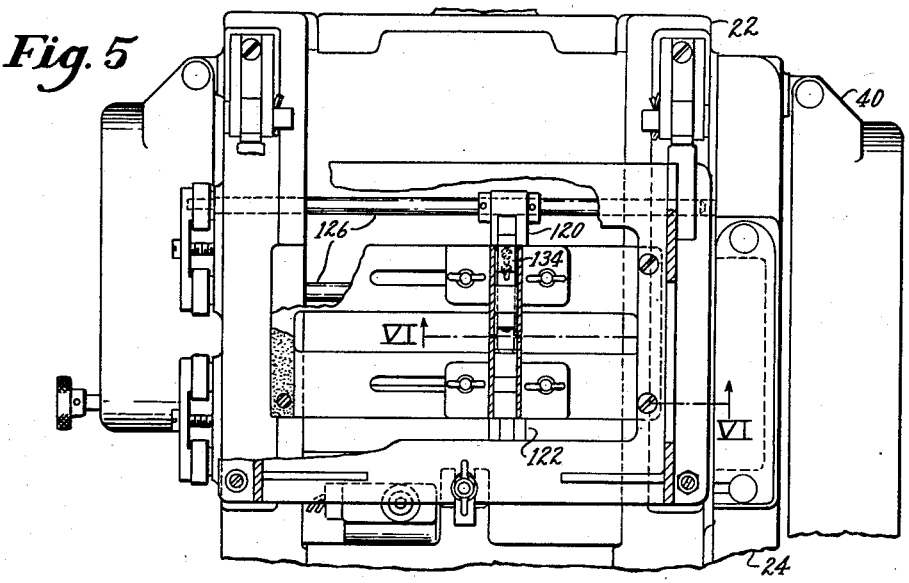
Fig. 5 is a plan view of an upper portion of the machine, its frame being partly broken away to show details of construction.
Figure 6:
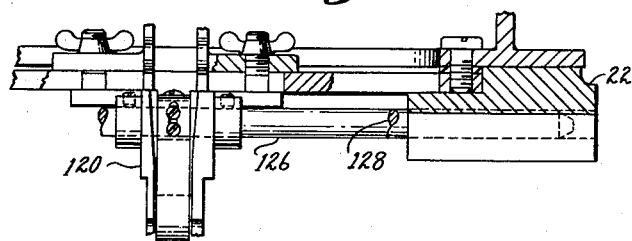
Fig. 6 is a section on the line VI—VI of Fig. 5 and indicating means for adjusting the path of the components through the machine.

The illustrative machine (Fig. 1) comprises a base 20 which supports a housing or main frame 22 enclosing most of the operating parts to be described, and a gear cover 24 secured to one side of the frame. A motor 26 within the base 20 is operatively connected through reduction gearing (not shown) to an endless drive chain 28 (Figs. 1, 2 and 11), the upper end of which is in mesh with a sprocket 30 (Fig. 11) keyed on a stub shaft 32 journaled in the frame 22 and in the cover 24. The outboard end of the shaft 32 has keyed thereon a gear 34 meshing with a gear 36 keyed on the outboard end of a drive shaft 38 also journaled in the frame 22 and in the cover 24. By mounting suitable later-mentioned change gears, after opening a door 40 (Figs. 1 and 5) pivoted on the gear cover 24, the machine may be driven through mechanism to be explained to obtain component straightening and belting speeds varying from about 2500 components per hour to about 30,000 components per hour, the selected speed normally being dictated by the size of the component bodies and/or the rate at which an operator can feed the machine.

Splined to the bored inboard end of the drive shaft 38 is a tubular sleeve 42 (Fig. 11) which carries a key 44 for coupling it to a lower composite straightening roll 46. This roll 46 is held in assembled relation and caused to abut endwise a shoulder formed on the sleeve 42 by means of a thrust washer, a lock washer, and a nut 47 threaded on the right-hand end (as viewed in Fig. 11) of the sleeve. The sleeve 42 is slidably mounted on an idler spindle 48 one end of which is seated in the centrally bored inboard end of the shaft 38, and the other end of which has a reduced diameter mounting a thrust washer 50, a compression spring 52, a spacer 54, ball bearings 56, 56, and a nut 58. The latter is normally mounted on the spindle 48 to hold the washer 50 yieldingly against an end of the sleeve 42. The ball bearings 56 are mounted in a cylindrical housing 60 secured to the frame 22, this housing having a cap 62 secured thereon by screws 64 (Figs. 4 and 11). Accordingly, this arrangement permits a convenient and quick disconnect of the straightening roll, it only being necessary to remove the cap 62 and slide the spindle 48 as assembled with the parts on its right end to the right (as viewed in Fig. 11) until the roll 46 and the sleeve 42 may together be removed. Thus, although the roll 46 includes a plurality of spacers 65, and a plurality of lead straightening disks or combs 66 which are interdigitally disposed with respect to similar straightening disks 68 (Fig. 11), correspondingly spaced on an upper and similarly composite cooperative straightening roll 70, the disks 68 do not interfere with removal of the roll 46 and its disks 66. In like manner, and by reason of similar disconnect mounting, the disks 66 do not bar removal of the upper roll 70, its parts being spaced on and keyed to a tubular sleeve 72 slidably mounted on a spindle 74. The latter has one end seated in the centrally bored inboard end of a stub shaft 76 and its other end projects with reduced diameter beyond the sleeve 72 to carry a thrust washed 78, a compression spring 80, a spacer 82, ball bearings 84, 84, and a nut 86. This nut normally holds the washer 78 yieldingly against an end of the sleeve 72. The composite roll 70 is held in assembled relation and caused to abut endwise a shoulder formed on the sleeve 72 by means of a thrust washer, a lock washer, and a nut 87 threaded on the right-hand end (as viewed in Fig. 11) of the sleeve 72. The bearings 84 are mounted in a cylindrical housing 88 (Figs. 4 and 11) secured to the frame 22, the housing having a cap 90 secured thereto by screws 92.

The peripheries of each of the disks 66, 68 are formed with regularly spaced lead receiving recesses preferably in the form of V-shaped notches 94 (Figs. 9, 10 and 11). Thus the bottoms of the notches of the disks 66 are axially alined for operation in phase with the bottoms of the cooperative notches of the disks 68 so that, as depicted in Figs. 10 and 11, substantially the entire lengths of both leads of successive components are progressively confined and any bent or kinked lead portions are finally caused by the pressure exerted by the alined cooperating bottoms of the notches, when in proximate or straightening position, to coincide with an axis which is normally the longitudinal axis of their component bodies. A perfectly coaxial lead would incur no effective displacement from any disk. It will be appreciated that different straightening rolls, and perhaps different disks within composite straightening rolls depending on the size of leads, will be substituted for operation on different sizes of components or on different lead diameters. The sleeve 72 is splined to a stub shaft 76, and the latter, which has bearings in the frame 22 and the gear cover 24, respectively, is operatively connected to the drive shaft 38 by means of a gear 96 (Fig. 11) on the shaft 76 meshing with a gear 98 on the shaft 38. Preferably, and as shown herein, for supporting the bodies of the successive components in appropriate position at the time of the final straightening actions of the disks 66, 68, the composite roll 46 includes a body gripper roll 100 (Figs. 10 and 11) provided with component receiving V-notches 102. The latter are in phase with the notches 94. Each component body having its leads straightened by the cooperative disks 66, 68 will be urged against the bottom centralizing walls of a notch 102 by the tread of a rubber-tired presser roll 104 included in the composite roll 70, thus insuring coincidence of the axis of the component body with the axis of the straightened leads.

Figure 7:
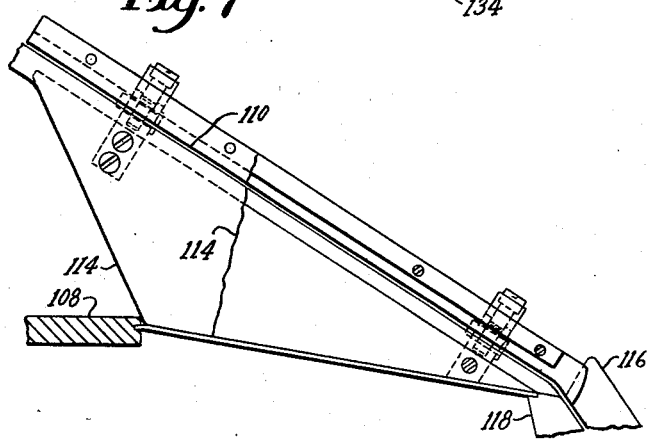
Fig. 7 is a detail view in side elevation of a raceway shown in Fig. 1 and through which components are fed into the machine.

The means by which successive components are regularly fed and guided into the rear of the machine and then through and away from lead straightening position will now be described. Secured to the upper, rearward face of the frame 22 is a pair of parallel table hinge brackets 106, 106 (Fig. 1) for supporting a component handling table 108. Containers or holders for the components C to be belted may be placed on this table and an operator may then conveniently feed the components into the machine via an inclined raceway 110 (Figs. 1 and 7) and a connecting, stepped chute 112 (Figs. 1, 9 and 10) sometimes designated as of the "waterfall" type. The raceway is supported by upstanding members 114, 114, respectively, secured to the brackets 106, and the chute 112 comprises adjustably spaced upper chute guides 116, 116, and correspondingly spaced lower chute guides 118, 118, all of which are mounted on the frame 22. The lower or delivery end of the chute 112 is disposed within the frame 22 and arranged to conduct the bodies of successive components into a channel defined by a pair of composite cam guideways 120, 122 (Figs. 5, 6, 8 and 10) having U-shaped cross sections (except where the rolls 100 and 104 are accommodated), these guideways being separated heightwise to provide spaced parallel passageways 124 (one only shown in Figs. 11 and 12) for the oppositely extending leads. As indicated in Figs. 8, 9 and 10, the guideway 120 is slidably mounted on cross rods 126, 126 and the guideway 122 is slidably mounted on cross rods 128, 128, the rods 126, 128 being secured in parallel relation in the frame 22.

For controlling the introduction of the successive components from the delivery end of the chute 112 into the channel of the guideways 120, 122, and in evenly spaced relation for consecutive advancement into the succession of alined bottoms of the V-notches 94, a pair of pick-up or feed disks 130, 130 (Figs. 10 and 11) is mounted on the sleeve 42 and keyed thereto. These disks are disposed adjacent to the external sides, respectively, of the guideways 120, 122, and have radial lead-receiving slots 132 disposed respectively in phase and registration with the bottoms of the V-notches 94. Each segment of the feed disks between consecutive slots 132 preferably has a perimeter the leading portion of which is circular and the trailing portion of which is flatted, better to enable the leading radial edge of a segment to pick off only an endmost component by its leads and thus transfer it from the chute 112 and advance it in the path determined by the guideways 120, 122. An extensible leaf spring 134 (Figs. 9 and 10) secured on the guideway 120 has a lower, arcuate end disposed to engage the bodies of successive components as they are picked off and thus insure that the leads enter the path determined by the guideways. The adjustable mounting of the spring 134 also serves to maintain alinement of the leads vertically prior to their pick off. This path, as most clearly shown in Figs. 10 and 11, passes through the lead straightening position, i.e., the path intersects the axes of a component body and its straightened leads, as constrained by the proximate coacting V-notches 94, 102, and thereafter the straightened component is moved along the path determined by the guideways 120, 122 away from the straightening position, and toward spacing and taping mechanism to be described.

In departing from the straightening position, each component is cammed out of its slots 132, 132 by reason of the arcuate course of the path determined by the guideways 120, 122 in extending away from the sleeve 42. A lower circular end portion of the guideways 120, 122 (Fig. 12) is closely adjacent to an upper portion of a spacing disk assembly generally designated 136, the lead path as determined by the guideways having substantially the same curvature as the locus of the bottoms of notches 138 between consecutive biased teeth 140 peripherally formed on three spacing disks 142. The regular peripheral spacing of the bottoms of these notches 138 is designed to accommodate and hold a succession of one particular size of component body in close, side-by-side, row formation to prevent wastage of tape about to be applied transversely of the leads. It is to be noted that, upon emerging from the radial slots 132, a component is to be deposited with its leads extending in three axially alined notches 138, and accordingly the spacing disk assembly 136 is driven in exact speed relation to the rotational speed of the straightening rolls 46, 70, a different assembly 136 being substituted when components of different body size are to be belted. It should also be noted that the guideway 120 is formed with a small flatted cam portion 144 (Figs. 8 and 10) at its junction with the teeth 140 to enable the components to be almost continuously under control in the machine but permit them to fall between, or be cammed downwardly the depth of, the teeth without danger of jamming. The bottoms of alined notches 138 thus cooperate with lead supporting surfaces 146 (Fig. 8) of the guideway 122 and lead holddown surfaces 148 of the guideway 120 to insure that each component will be maintained in straightened coaxial condition as it progresses through a tape applying zone which, as later explained, may optionally include lead trimming means.

The spacing disk assembly 136 comprises cylindrical spacers 150, 152, 154, 156 (Fig. 12) which are keyed on a tubular sleeve 158 and held in assembled relation against a shoulder formed thereon by washers and a nut 160 threaded onto one end of the sleeve. The latter is keyed internally to a spindle 162 and splined at its other end to a drive shaft 164 having bearings in the frame 22 and in the gear cover 24. The spindle 162 is thus rotatably supported with one end extending in an axial bore in the drive shaft 164 and its other end carrying a compression spring 166, a spacer 168, and roller bearings 170, 170 mounted in a housing secured in the frame 22. For a purpose later mentioned, the outboard end of the spindle 162 carries a gear 172 (Figs. 4 and 12), and a retainer nut 174 threaded on the spindle normally urges compression of the spring 166 against a shoulder of the spindle 162 yieldingly to maintain the spacing disk assembly 136 in operative position.

Figure 3:
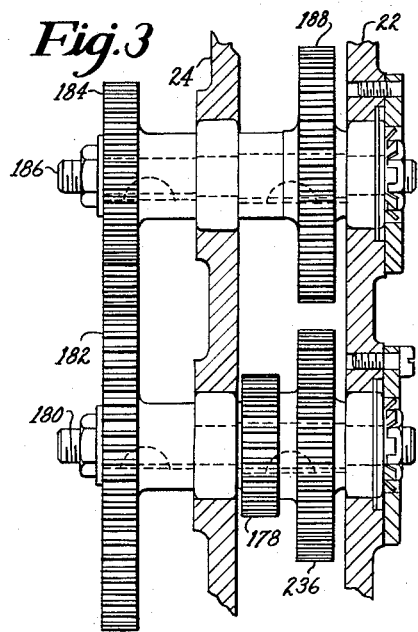
Fig. 3 is a section taken on the line III—III of Fig. 2.

Operation of the spacing disk assembly 136 at the appropriate speed is effected by means of gearing driven from the shaft 76, as will now be explained. A gear 176 (Figs. 2 and 12) keyed on the shaft 164 is in mesh with a gear 178 (Figs. 2, 3 and 12) carried by a stub shaft 180 having bearings in the frame 22 and the cover 24. The outboard end of this shaft carries a change gear 182 meshing with a change gear 184 secured on the outboard end of a stub shaft 186 journaled in the frame 22 and the cover 24. A gear 188 fixed on the shaft 186 is driven by a gear 190 secured on the shaft 76. Safety means are provided, though not explained herein, whereby upon opening of the door 40 (or any other access covers mounted on the frame) to substitute change gears or for other purposes, a control line connecting a start-stop switch 192 to the motor 26 will be electrically interrupted to prevent machine operation.

In order to cut and belt the leads of the straightened and spaced components just before they emerge from between the guideways 120, 122, the machine is provided with cooperative pairs of presser rolls 194, 194 (Figs. 10, 12 and 13) and, if desired or needed, rotary shear knives 196 coacting with anvil knives 198. For supplying the continuous strip material for belting the leads extending from corresponding ends of the components, tape is supplied from detachably mounted reels 210 (Figs. 1 and 9) and applied in confronting or overlapped relation. The upper or top tape is designated TT and the lower tape is designated LT.

In order to accumulate the belted components at the front of the machine, a reel 250 (Figs. 1 and 9) is detachably mounted and will be rotated counterclockwise (as viewed in Figs. 1 and 9) to wind in the straightened, trimmed, and belted components as rapidly as they are processed in the machine and their tapes can be released with the components from the spacing disks 142.

From the foregoing it will be appreciated that this invention provides a compact, versatile, and highly productive machine for straightening and belting coaxial lead components.

Having thus described our invention, what we claim as new and desired to secure by Letters Patent of the United States is:

1. A machine for straightening the leads of coaxial lead type components, comprising a plurality of axially spaced rotary disks, a second plurality of axially spaced rotary disks interdigitally disposed with respect thereto, each plurality being divided axially into similarly spaced groups, the disks of at least one of these pluralities being provided with peripherally spaced recesses the bottoms of which are shaped to constrain a portion of each lead against relative movement, means for rotating both pluralities of disks so that the lead engaging bottoms of the peripheral recesses are in phase to effect axial alinement of consecutive leads fed therebetween, means for feeding successive components between the pluralities of disks in time relation to their operating speed, and means providing a passageway extending between said groups for the reception of the bodies of the components in the course of their feeding movements.

2. A machine for straightening the leads of successive coaxial lead components comprising two pairs of cooperative lead straightening members including a plurality of rotary disks staggered axially, the peripheries of said disks being formed with V-shaped recesses; and the bottoms of said recesses of one member being axially alined to co-operate at a lead straightening position with the bottoms of said recesses of the coacting member to determine the direction a lead is to extend from its component body, means for conducting successive components into and out of said position, said means comprising a raceway, guide means defining a component body-receiving channel extending from the raceway, between said pairs, and through said position, and a pair of radially slotted feed disks disposed to pick up successive components from the delivery end of the raceway and advance them through the channel by engagement with their leads adjacent to their component bodies, and means for synchronizing the action of the straightening members with that of the conducting means.

3. A machine for straightening coaxial leads of components comprising a pair of cooperative, composite rolls respectively mounted for rotation about parallel axes, each of said rolls including interdigitated V-notched disks disposed in axially spaced groups to engage and axially aline the leads of successive components with the axes of their respective bodies, a passageway extending between the axially spaced groups of disks for receiving and guiding the component bodies, one of said rolls including a wheel disposed to engage the bodies of the successive components in said passageway, and the other of said rolls including a wall formed with notches disposed to receive the leads of a component to support its body for contact with said first-mentioned wheel, and means for causing substantially simultaneous engagement with the leads of the successive components of the walls of the alining notches in the pair of rolls.

4. A machine for processing axial lead components comprising a frame, a pair of shafts mounted therein, peripherally recessed members rotatably mounted on each of said shafts, the recesses of said members on one shaft being axially alined and peripherally spaced to receive the leads of a component and straightening them in collaboration with corresponding recesses of the members on the other shaft when said corresponding recesses are in proximate position, said recesses having a bottom width substantially equal to the thickness of a lead to constrain it between them, a pair of rotary feed disks mounted on one of said shafts and having radial slots adapted to receive and advance the successive components to be straightened, guide means cooperative with said radial slots in the course of rotation of said feed disks and formed to receive the component bodies to conduct the components successively into and out of said proximate position for straightening, and means for causing substantially simultaneous engagement with the leads of the walls of the collaborating recesses.

5. A machine for straightening the leads of components comprising a plurality of axially spaced rotary disks, a second plurality of axially spaced rotary disks interdigitally disposed with respect thereto, each of the disks of said pluralities being provided with peripherally spaced V-shaped recesses, means for rotating both pluralities of disks so that lead engaging bottoms of the peripheral recesses are in phase to effect axial alinement of consecutive leads fed therebetween, means for feeding successive components between the pluralities of disks in time relation to their operating speed, said pluralities of disks being in divided arrangement to accommodate the component bodies, and means for maintaining the bodies of the components in axial alinement with the lead engaging bottoms of said recesses.

References Cited in the file of this patent

UNITED STATES PATENTS

| | | |
|---|---|---|
| 191,085 | Thompson et al. | May 22, 1877 |
| 500,383 | Gendron | June 27, 1893 |
| 1,537,501 | Seley et al. | May 12, 1925 |
| 2,622,654 | Frank | Dec. 23, 1952 |
| 2,772,416 | Dorosz et al. | Dec. 4, 1956 |
| 2,860,686 | Frank et al. | Nov. 18, 1958 |

FOREIGN PATENTS

| | | |
|---|---|---|
| 80,423 | Switzerland | Mar. 1, 1919 |
| 573,994 | Germany | Apr. 7, 1933 |